United States Patent [19]
Watanabe et al.

[11] 3,952,303
[45] Apr. 20, 1976

[54] DOPPLER RADAR FOR FORECASTING COLLISION

[75] Inventors: Masahiro Watanabe; Hideo Shibuya, both of Sagamihara; Yasuhide Sakai, Kawasaki; Ryuji Hori; Mistuaki Kamiharako, both of Yokohama; Kazuo Sato, Toyota, all of Japan

[73] Assignees: Matsushita Electric Industrial Co., Ltd., Osaka; Toyota Jidosha Kogyo Kabushiki Kaisha, Toyota, both of Japan

[22] Filed: Feb. 13, 1974

[21] Appl. No.: 442,240

[30] Foreign Application Priority Data
Feb. 15, 1973 Japan.............................. 48-18939

[52] U.S. Cl. ............................... 343/9; 343/7 VM
[51] Int. Cl.² ..................... G01S 9/37; G01S 9/46
[58] Field of Search .................. 343/7 ED, 9, 7 VM

[56] References Cited
UNITED STATES PATENTS

| | | |
|---|---|---|
| 2,476,301 | 7/1949 | Jenks............................... 343/7 ED |
| 3,394,342 | 7/1968 | Walker............................. 343/7 ED |
| 3,684,309 | 8/1972 | Uchiyamada et al......... 343/7 ED X |
| 3,697,985 | 10/1972 | Faris et al...................... 343/7 ED X |
| 3,750,172 | 7/1973 | Tresselt................................ 343/9 X |
| 3,766,554 | 10/1973 | Tresselt................................ 343/9 X |

Primary Examiner—Malcolm F. Hubler
Attorney, Agent, or Firm—Stevens, Davis, Miller & Mosher

[57] ABSTRACT

A Doppler radar for forecasting collision, in which three consecutive Doppler signals are obtained by radiating microwave forwardly from the front of a car, the frequency of the microwave being consecutively switched in three steps at a constant interval, and combining the aforesaid microwave and reflected microwave reflected from an object for obtaining intelligence about the distance of the object from the car front, residual time left for the object to reach the car front as well as forecasting collision or non-collision from two of the three Doppler signals and obtaining intelligence about the sense of relative velocity of the object relative to the car front from the remaining Doppler signal and one of the aforesaid two Doppler signals.

6 Claims, 16 Drawing Figures

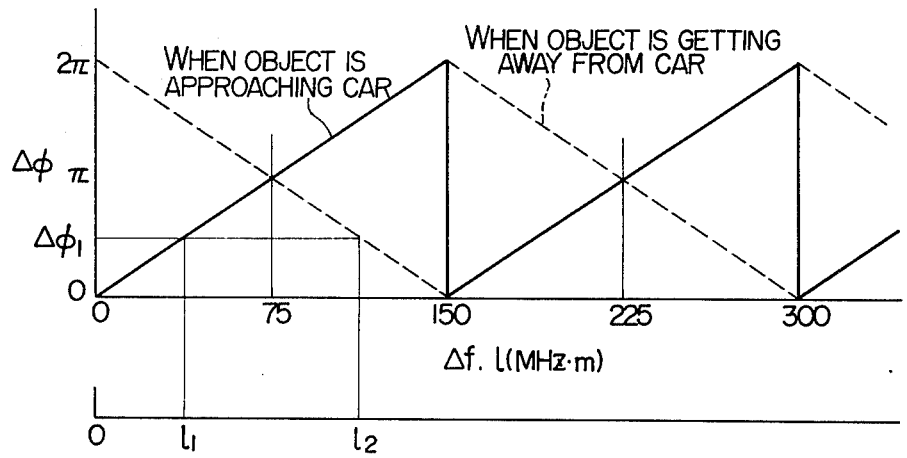
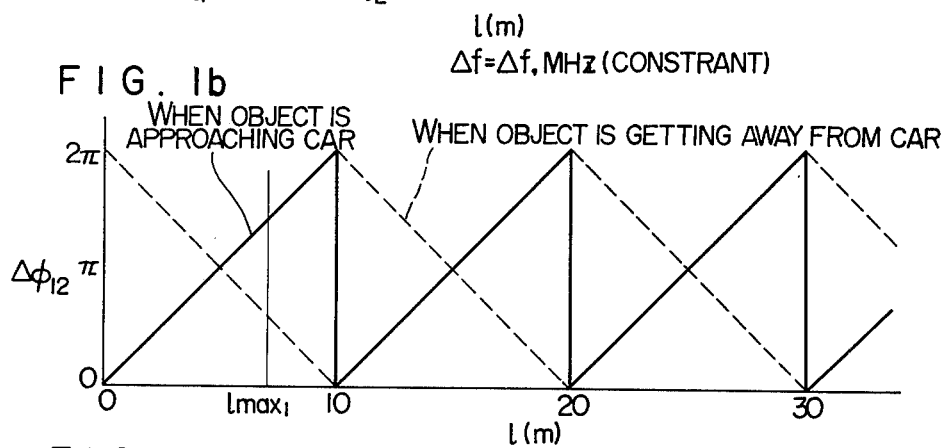
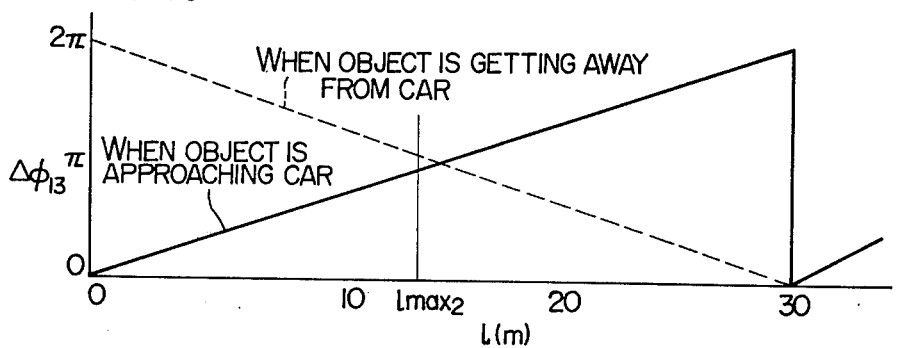

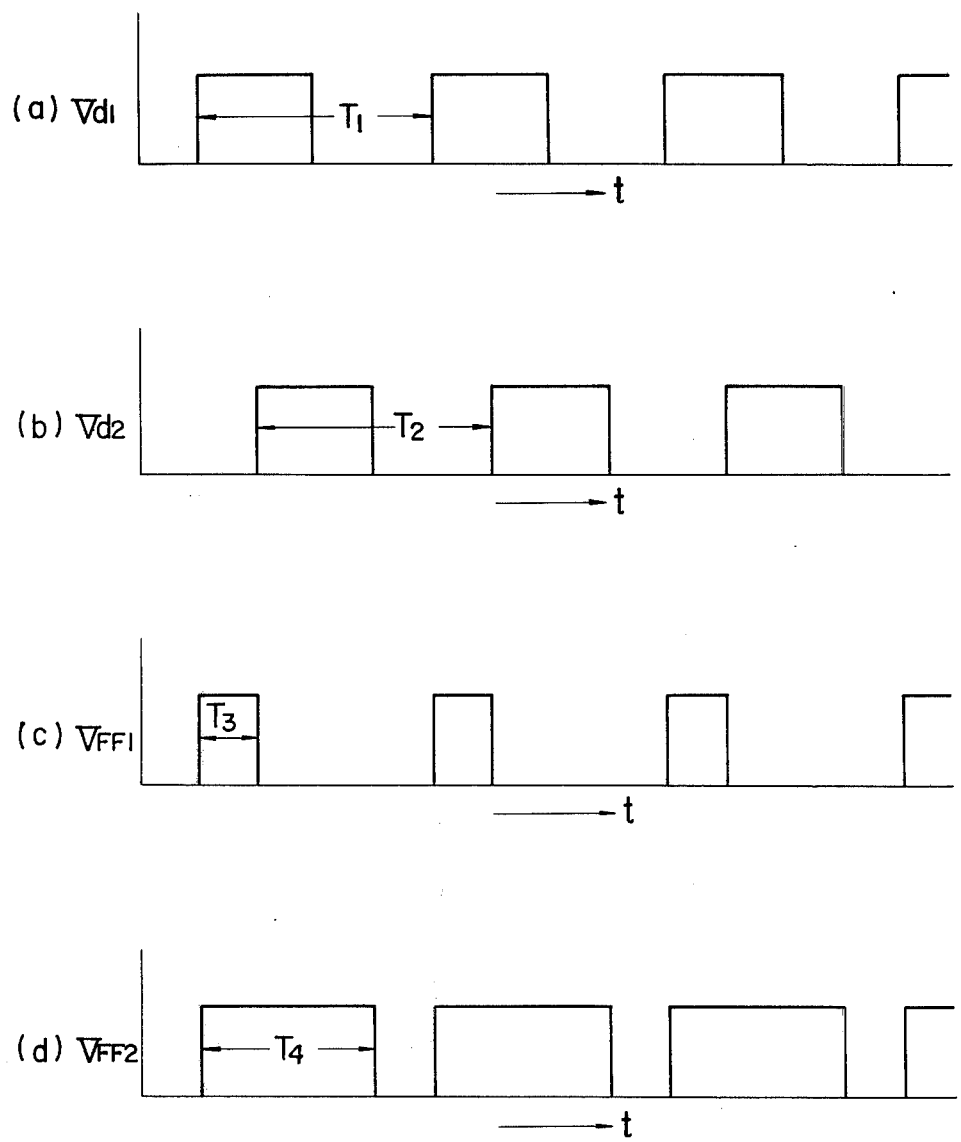

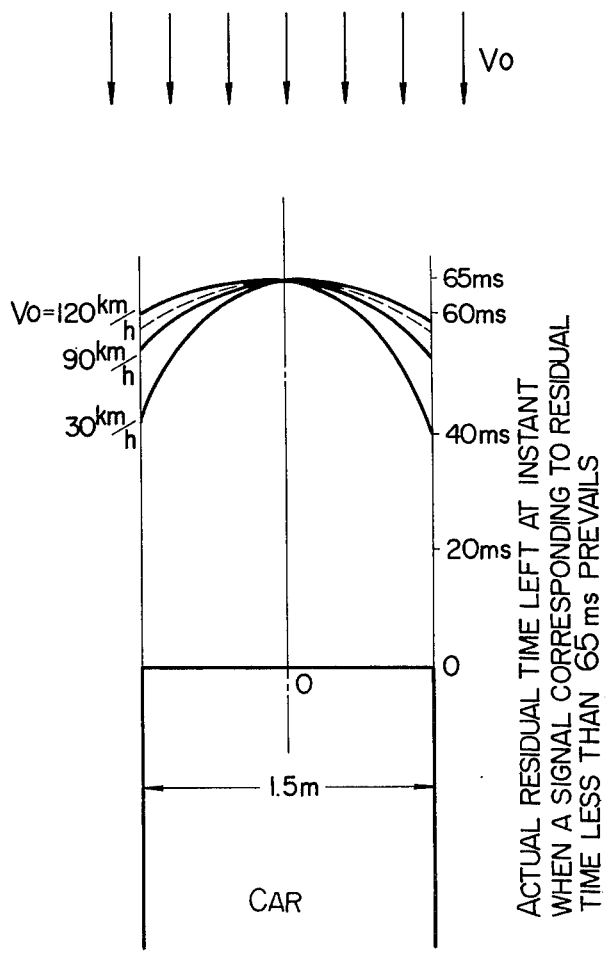

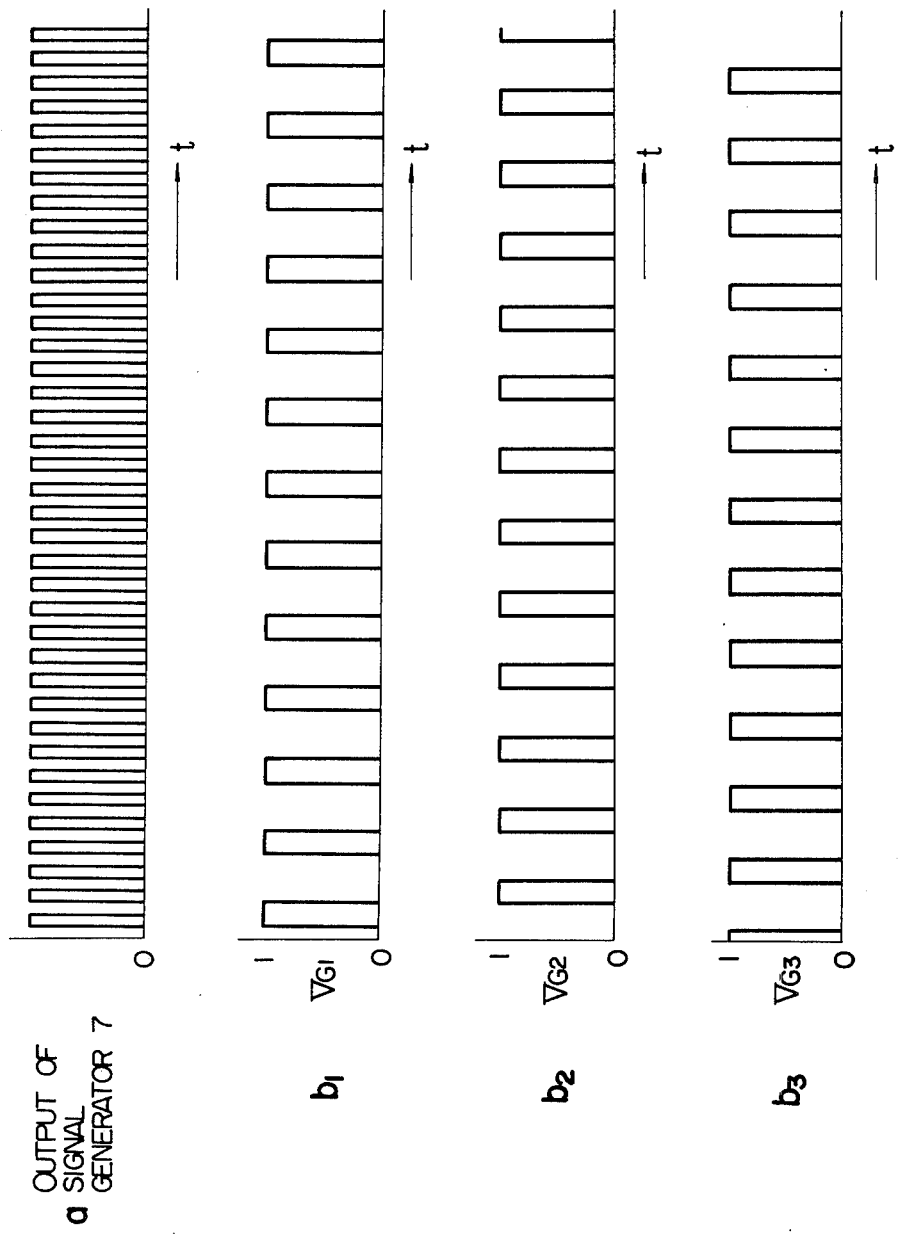

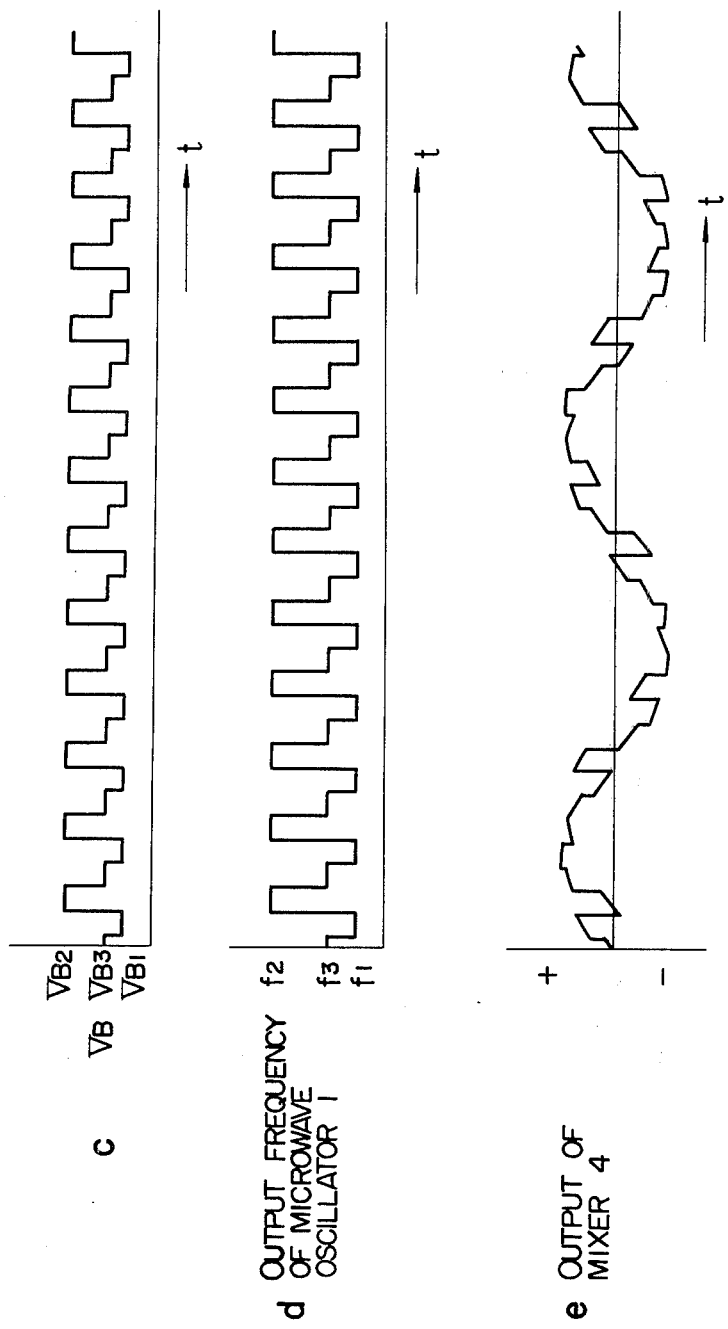

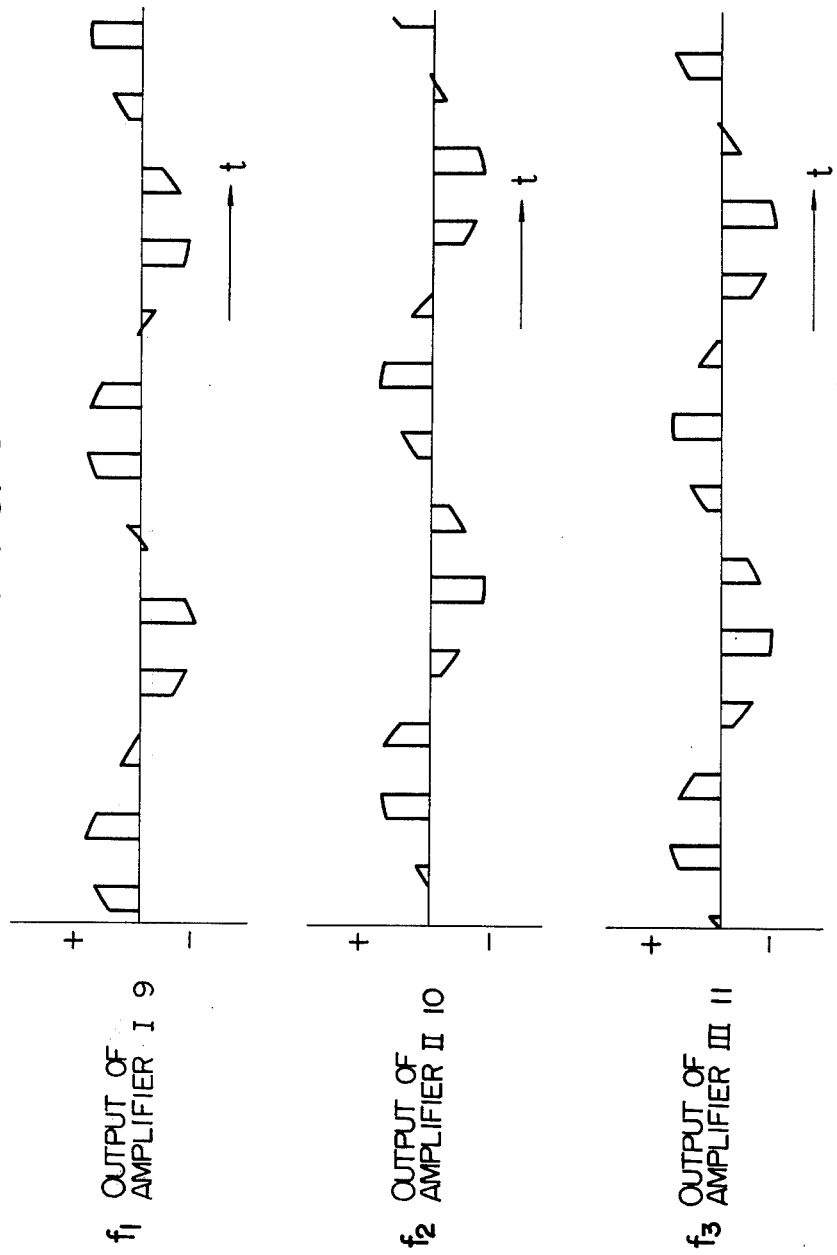

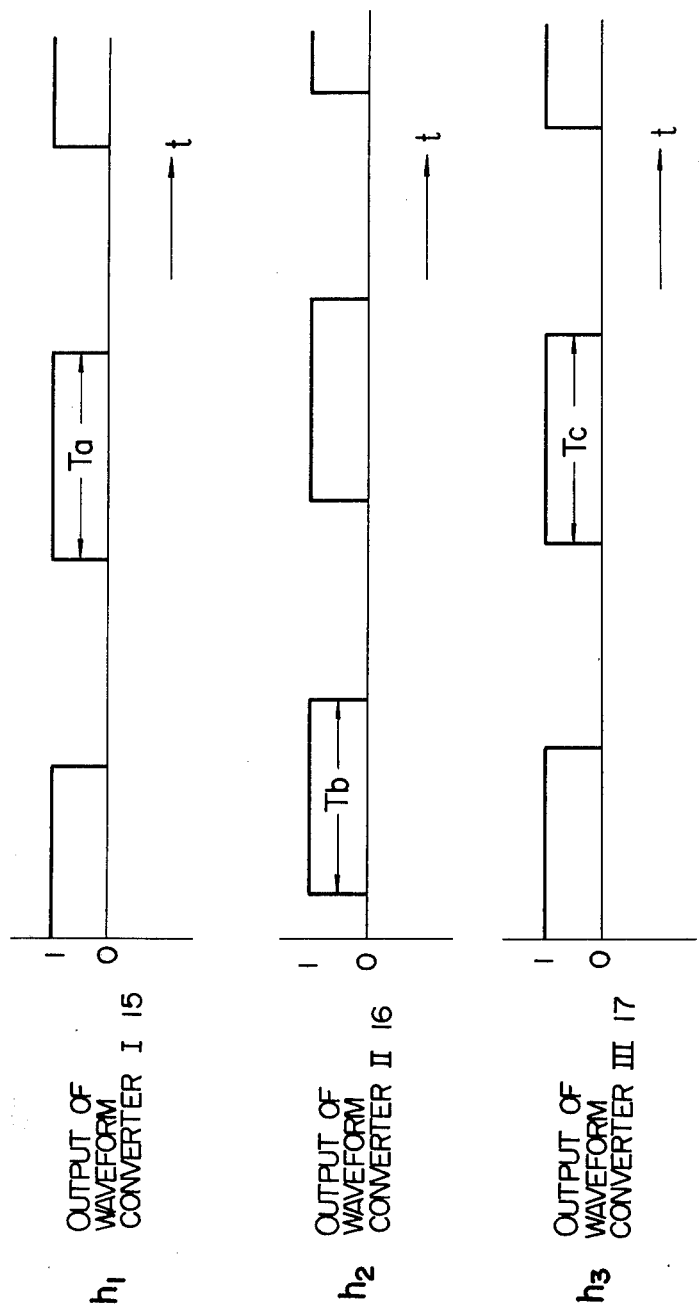

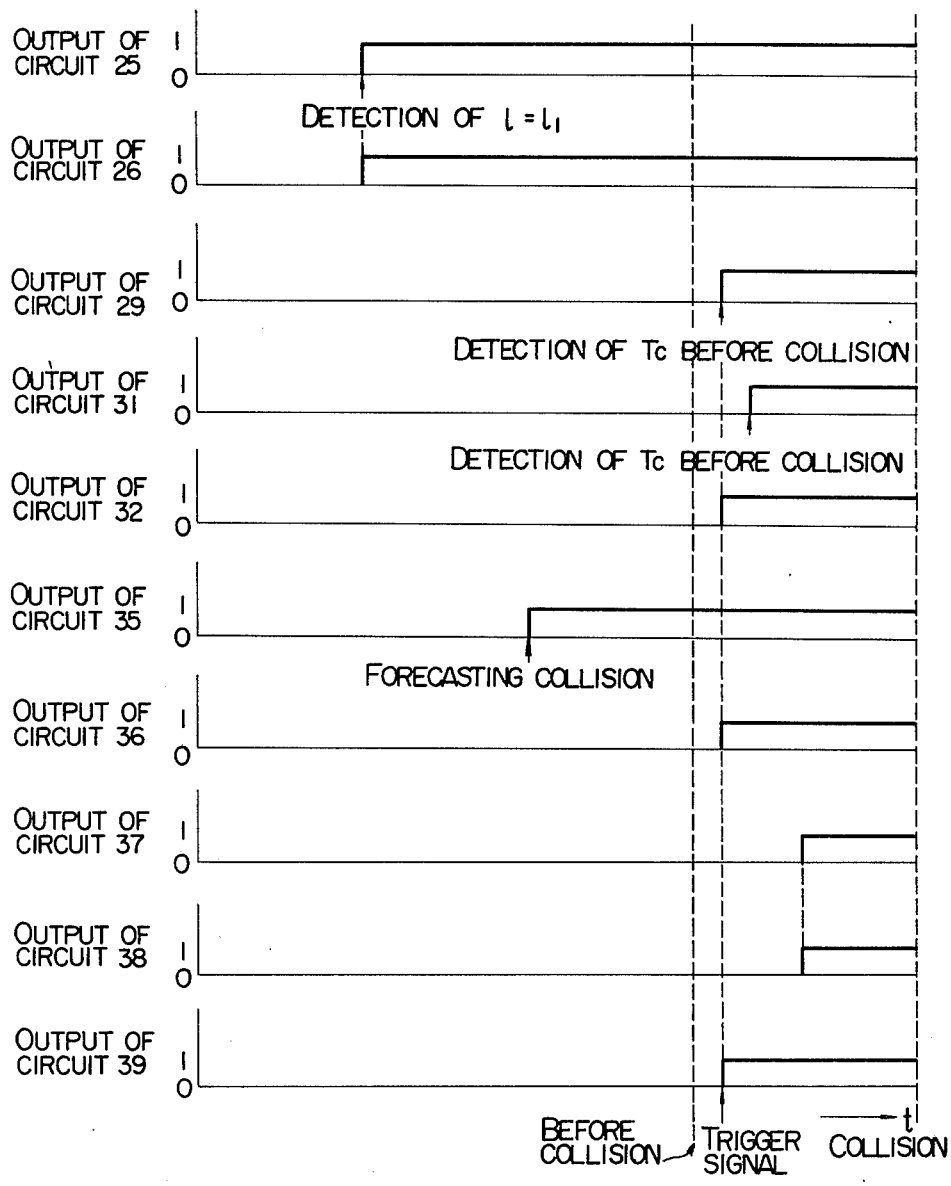

DOPPLER RADAR FOR FORECASTING COLLISION

This invention relates to Doppler radars to be used as collision forecaster for air bags.

The air bag is a device which acts to absorb kinetic energy tending to flying automobile occupants forwardly at the time of a collision of the automobile to thereby minimize injury.

In order to be able to cause timely expansion of the air bag a collision sensor for forecasting a collision or sensing it immediately after its occurrence is necessary.

Among the collision sensors radar sensors can forecast a collision, and the radar sensors include Doppler radars, which utilize the fact that an electromagnetic wave or sound wave reflected from an object undergoes frequency deviation in proportion to the relative velocity of the object due to the Doppler effect. The Doppler radar used as collision sensor is required to have A. the function of deciding whether or not an object will collide with the automobile carrying it, and B. the function of delivering when the decision for occurrence of a collision is made, a trigger signal for causing the expansion of the air bag a predetermined time before the collision of automobile and object actually takes place.

There are various systems that have been proposed to meet the above requirements, and the most superior one of these systems is a two-channel Doppler radar consisting of left and right channels each provided with, transmitting and receiving antennas. With this system, the decision about a collision is made upon enterance of the object into a range established from a. intelligence about distance (of the object from the transmitting and receiving antennas), b. intelligence about relative velocity (of the object relative to the transmitting and receiving antennas), c. intelligence about the sence of velocity (i.e., the intelligence about whether or not the object is approaching the transmitting and receiving antennas), and d. intelligence about residual time (left until the object reaches the transmitting and receiving antennas).

While this two-channel system can meet the aforementioned requirements, its circuit construction is complicated with a great number of component parts, and the reliability and cost are not satisfactory.

It is an object of the present invention to meet the afore-mentioned requirements with a single channel Doppler radar system with a transmitting antenna provided at or near the center of the front bumper of an automobile and a receiving antenna provided at or near the center of the front bonnet of the automobile.

With the Doppler radar according to the invention, it is possible to construct a radar collision forecaster for air bags, which is simple in construction and inexpensive and nevertheless has performance very comparable with that of the prior art two-channel system.

The above and other objects, features and advantages of the invention will become more apparent from the following description when the same is read in connection with the accompanying drawings, in which:

FIGS. 1a, 1b and 1c are diagrams illustrating the method of obtaining the "intelligence about sense of velocity" constituting the first feature of the invention;

FIGS. 3, 4, 5a to 5d, 6 and 7 are diagrams illustrating the method of effecting the "determination whether or not an object will collide with the automobile" constituting the third feature of the invention;

Figure 8A:
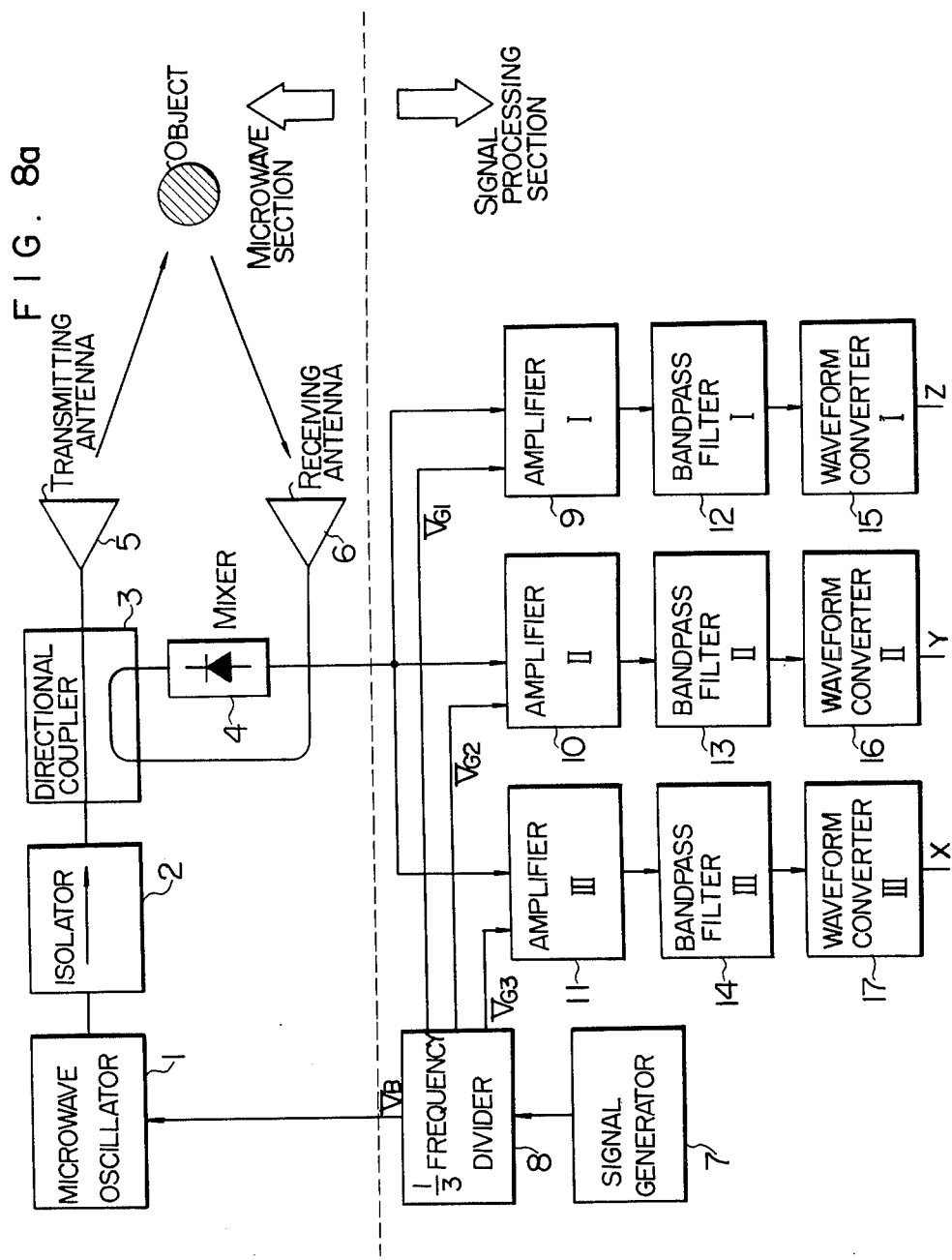
Figure 8B:
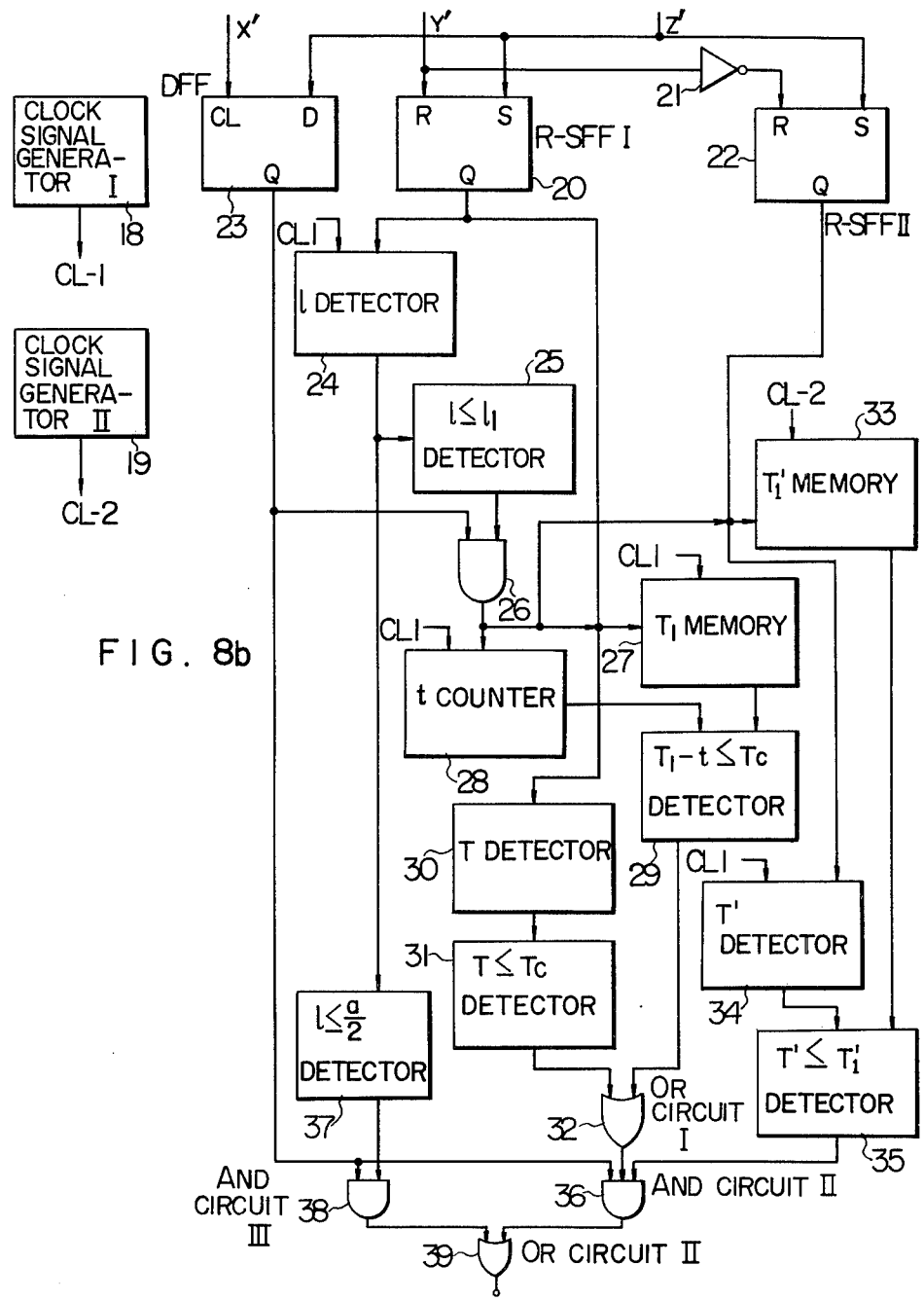
Figure 9:
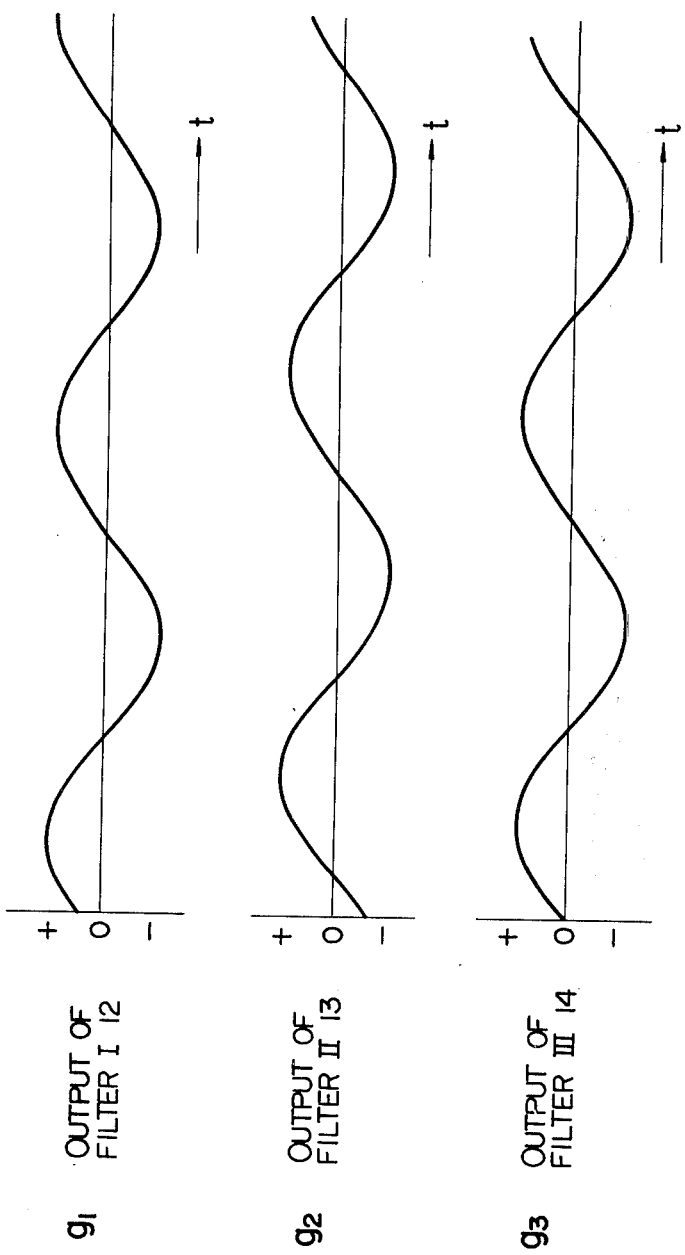
Figure 9:
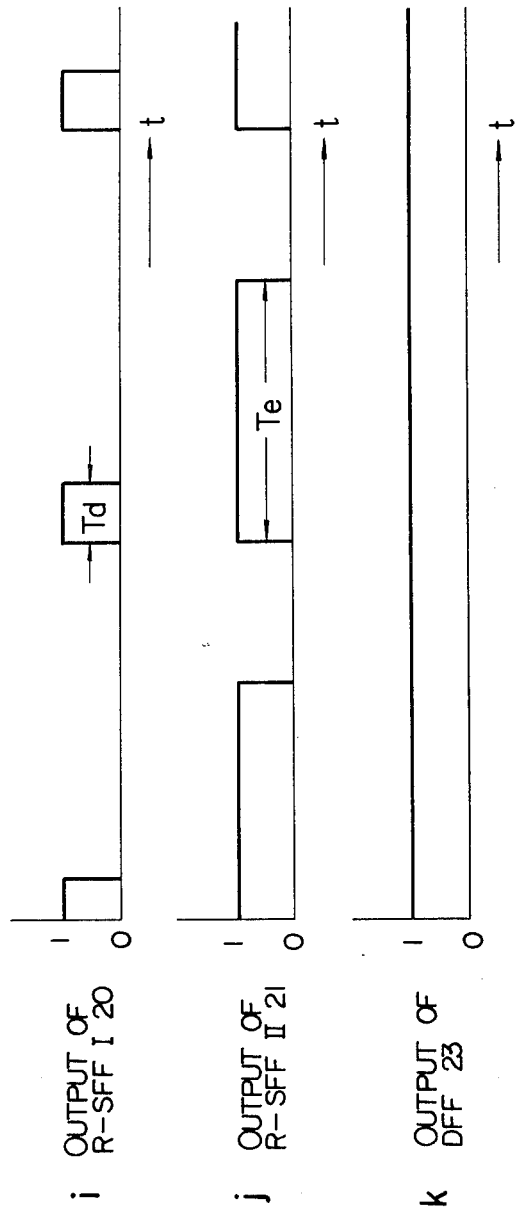

FIGS. 8a and 8b show block diagrams outlining the construction of a specific embodiment of the collision sensor Doppler radar according to the Invention; and FIGS. 9 and 10 are waveform charts illustrating the operation of the embodiment of FIGS. 8a and 8b.

Among various methods proposed heretofore for obtaining the distance intelligence with the Doppler radar there are 1. one in which the distance intelligence is obtained from Doppler signal level through CW system, 2. one in which the distance intelligence is obtained from the amplitude ratio between the Doppler frequency component and component of the sum or difference of modulating frequency and Doppler frequency of the output of a mixer containing part of a transmitted wave and a reflected wave through an FM system, and 3. one through a frequency switching system.

With the CW system in the first case, the precision of measurement is inferior since the distance is not determined solely by the Doppler signal level.

With the FM system in the second case, the precision of measurement is satisfactory, but the circuit construction is complicated on the debit side.

The frequency switching system in the third case enables to obtain as high precision of measurement as in the second case with a simpler circuit construction.

From the above grounds, the Doppler radar according to the invention adopts the frequency switching system using microwaves.

The frequency switching system here mentioned is one in which microwaves at frequencies $f_1$ and $f_2$ ($f_2 - f_1 = \Delta f > 0$) are radiated on a time division basis, that is, they are switched alternately so as to obtain the distance intelligence from the phase difference between alternate Doppler signals obtained from a mixer combining part of each transmitted wave and corresponding reflected waves reflected from an object and the relative velocity intelligence from the frequency of either Doppler signal.

This principle will now be discussed mathematically.

For the microwave at frequency $f_1$ the transmitted wave $e_{T_1}$ and reflected wave $e_{R_1}$ are expressed as $$e_{T_1} = E_{T_1} e^{j2\pi f_1 t} \tag{1-a}$$

and $$e_{R_1} = E_{R_1} e^{j(2\pi f_2 t - \theta - 2\pi f_1 \tau)} \tag{1-b}$$

Then, the output $e_{D_1}$ of the mixer combining part of the transmitted wave and reflected wave is $$e_{D_1} = E_{D_1} e^{-j(\theta + 2\pi f_1 \tau)}$$
$$= E_{D_1} e^{-j(\theta + 2\pi f_1 2l/c)} \tag{1-c}$$

the frequency $f_{d1}$ of the mixer output is $$f_{d1} = \frac{1}{2\pi} \cdot \frac{d}{dt} (\theta + 2\pi f_1 \cdot \frac{2l}{c})$$
$$= 2 \cdot \frac{f_1}{c} \cdot \frac{dl}{dt} = 2 \cdot \frac{f_1}{c} \cdot V_r \tag{1-d}$$

and the phase $\phi_{D1}$ of the mixer output is $$\phi_{D1} = -\theta - 2\pi f_1 \cdot \frac{2l}{c} \tag{1-e}$$

where $\phi$ is the phase change introduced when the transmitted wave is reflected at the object, T is the time required for the transmitted wave to make a return trip between a reference point and the object and is given as $2\,l/c$ with $l$ being distance between reference point and object and $c$ being speed of propagation, and $$V_r = \frac{dl}{dt}$$

is the relative velocity of the object relative to the reference point.

For the other microwave at frequency $f_2$ ($f_2 = f_1 + \Delta f$, $\Delta f << f_1, f_2$) the transmitted wave $e_{T_2}$ and reflected wave $e_{R_2}$ are given as $$e_{T_2} = E_{T_2} e^{j2\pi f_2 t} \tag{2-a}$$

and $$e_{R_2} = E_{R_2} e^{j(2\pi f_2 t - \theta - 2\pi f_2 T)} \tag{2-b}$$

Then, the output of the mixer combining part of the transmitted wave and reflected wave is $$e_{D2} = E_{D2} e^{-j(\theta + 2\pi f_2 T)}$$

$$= E_{D2} e^{-j(\theta + 2\pi f_2 \cdot 2l/c)} \tag{2-c}$$

the frequency $f_{d2}$ of the mixer output is $$f_{d2} = \frac{1}{2\pi} \cdot \frac{d}{dt}(\theta + 2\pi f_2 \cdot \frac{2l}{c})$$

$$= 2 \cdot \frac{f_2}{c} \cdot \frac{dl}{dt} = 2\frac{f_2}{c} V_r \tag{2-d}$$

and the phase $\phi_{D2}$ of the mixer output is $$\phi_{D2} = -\theta - 2\pi f_2 \cdot \frac{2l}{c} \tag{2-e}$$

Since $\Delta f << f_1, f_2$ here, $f_1 \approx f_2$, so that $$f_{D1} = f_{D2} \; \alpha \; V_r \tag{1,2-f}$$

For the phase difference $\Delta\phi$, $$\Delta\phi = \phi_{D1} - \phi_{D2} = 2\pi f_2 \frac{2l}{c} - 2\pi f_1 \frac{2l}{c}$$

$$= \frac{2l}{c} \cdot 2\pi \Delta f \; \alpha \; l \tag{1,2-g}$$

Thus, the Doppler signal frequency gives the relative velocity intelligence, and the phase difference gives the distance intelligence.

FIG. 1a shows the relation of equation 1,2-g. More particularly, the Figure shows the relation of $\Delta\phi$ to $\Delta f$. $l$, with the solid plot representing the case where the object is approaching the reference point and the dashed plot representing the case where the object is getting away from the reference point.

With this intelligence, however, we cannot tell whether the object is approaching or getting away from the reference point. More particularly, if $\Delta f = \Delta f_1$ (constant) such that $$75 \,(\text{MHz.m}) < \Delta f_1 \cdot l_{max} < 150 \,(\text{MHz.m})$$

where $l_{max}$ is the maximum distance required for the Doppler radar to detect, with the phase difference $\Delta\phi$ between the Doppler frequencies $f_{d1}$ and $f_{d2}$ is equal to $\Delta\phi_1$ ($\Delta\phi = \Delta\phi_1$) we cannot tell whether the object is at distance $l_1$ and approaching the reference point or is at distance $l_2$ and getting away from the reference point. To solve this problem, we may set $$\Delta f \cdot l_{max} < 75 \,(\text{MHz.m})$$

Doing so, however, is accompanied by a sacrifice in the resolution of the distance measurement.

According to the first feature of the invention, this problem is solved by incorporating the following principles.

Unlike the prior art frequency switching system which has two different frequencies, according to the invention three different frequencies $f_1, f_2$ and $f_3$ ($f_2 - f_1 = \Delta f_{21}$ and $f_3 - f_1 = \Delta f_{31}$) are used, with $\Delta f_{21}$ and $\Delta f_{31}$ set, for instance, such that $$\Delta f_{21} \cdot l_{max1} < 150 \text{ MHz.m} \tag{3}$$

and $$\Delta f_{31} \cdot l_{max} < 75 \text{ MHz.m} \tag{4}$$

where $l_{max}$ is the maximum detection distance required for the Doppler radar as a sensor, $l_{max1}$ ($l_{max1} < l_{max}$) is the maximum detectable distance which is determined depending on parameters such as the output of a microwave oscillator and the gain of an antenna, etc., and $d_1$, $d_2$ and $d_3$ are Doppler signals obtained by frequencies $f_1, f_2$ and $f_3$ respectively, and with $\Delta f_{21}$ set such that $0 \leq \Delta\phi_{12} < 2\pi$ or $0 \leq \Delta\phi_{12} \leq 2\pi$ within the distance range from 0 to $l_{max\,1}$ and $\Delta f_{31}$ set such that $0 \leq \Delta\phi_{13} < \pi$ or $\pi < \Delta\phi_{13} \leq 2\pi$ within the distance range of from 0 to $l_{max}$. In the above, $\phi_{12}$ is the phase difference between the Doppler signals $d_1$ and $d_2$, whereas $\phi_{13}$ is the phase difference between the Doppler signals $d_1$ and $d_3$.

With this system, sufficient resolution of distance measurement can be ensured with the distance intelligence obtained from the phase difference $\Delta\phi_{12}$ between the signals $d_1$ and $d_2$ over the distance range from 0 to $l_{max}$, while the intelligence about whether the object is approaching or getting away from the reference point, i.e., relative velocity sense intelligence, may be obtained from the phase difference $\Delta\phi_{13}$ between the signals $d_1$ and $d_3$ over the distance range from 0 to $l_{max}$, over which one-to-one correspondence of $\Delta\phi_{13}$ to $l$ holds.

FIGS. 1b and 1c show the relation of the phase difference $\Delta\phi_{12}$ between Doppler signals $d_1$ and $d_2$ to the distance $l$ and the relation of the phase difference $\Delta\phi_{13}$ between Doppler signals $d_1$ and $d_3$ to the distance $l$ with $l_{max1} = 7$ m and $l_{max} = 14$ m and $\Delta f_{21}$ and $\Delta f_{31}$ respectively set to 15 MHz and 5 MHz to meet the inequalities 3 and 4.

It will be apparent from FIG. 1c that within the distance range $0 < l < 15$ m it can be determined that the object is approaching the transmitting and receiving antennas for $0 \leq \Delta\phi_{13} < \pi$ and is drawing away from the transmitting and receiving antennas for $\pi < \Delta\phi_{13} \leq 2\pi$.

Now, the method of obtaining the residual time intelligence will be discussed. In the prior art frequency switching Doppler radar system, the residual time is determined from the distance intelligence obtained from the phase difference of Doppler signals and the relative velocity intelligence obtained from the Doppler signal frequency by using the relation $$\text{Residual time} = \frac{\text{Distance}}{\text{Relative velocity}}$$

In accordance with the second feature of the invention, the residual time is determined more simply under the following principles.

Denoting the periods of the Doppler signals $d_1$ and $d_2$ by $T_1$ and $T_2$ and the time length of the phase difference $\Delta\phi_{12}$ of the Doppler signals $d_1$ and $d_2$ by $T_3$ satisfying $$\Delta\phi_{12} \alpha \; \frac{T_3}{T_1} \approx \frac{T_3}{T_2}$$

$$T_1 \approx T_2 \; \alpha \; \frac{1}{V_r}$$

and $$\frac{T_3}{T_1} \approx \frac{T_3}{T_1} \; \alpha \; l$$

Thus, the residual time $$\frac{l}{V_r}$$

is $$\frac{l}{V_r} \alpha \; T_1 \times \frac{T_3}{T_1} \approx T_2 \times \frac{T_3}{T_2} = T_3$$

that is, the residual time intelligence can be obtained directly from the time length $T_3$.

Figure 2:
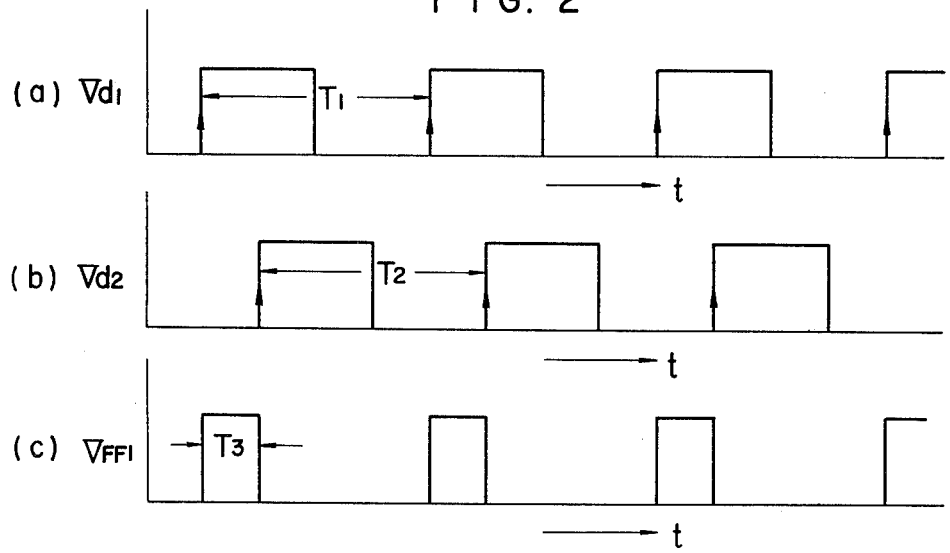
FIG. 2 is a diagram illustrating the method of obtaining the "intelligence about residual time" constituting the second feature of the invention.

In actual practice, the Doppler signals $d_1$ and $d_2$ are converted through limiter amplifiers or the like into corresponding rectangular waves (as shown at $a$ and $b$ in FIG. 2) to set a reset-set type flip-flop (R-S FF) by the rising of the wave $a$ and reset the R-S FF by the rising of the wave $b$, and then the time length of the output of the R-S FF (as shown at $c$ in FIG. 2) gives the residual time intelligence.

The third feature of the invention resides in the function of determining whether or not a collision will take place, the function being required for the collision sensor Doppler radar, from the above-mentioned relative velocity intelligence obtained from the frequency of the Doppler signals $d_1$, $d_2$ and $d_3$ in the afore-mentioned frequency switching type Doppler radar, distance intelligence obtained from the phase difference $\Delta\phi_{12}$ between the Doppler signals $d_1$ and $d_2$, relative velocity sense intelligence otained from the phase difference between the Doppler signals $d_1$ and $d_3$ and residual time intelligence obtained from the afore-mentioned time length $T_3$.

The principles underlying the collision forecasting function according to the invention will now be discussed.

Figure 3:
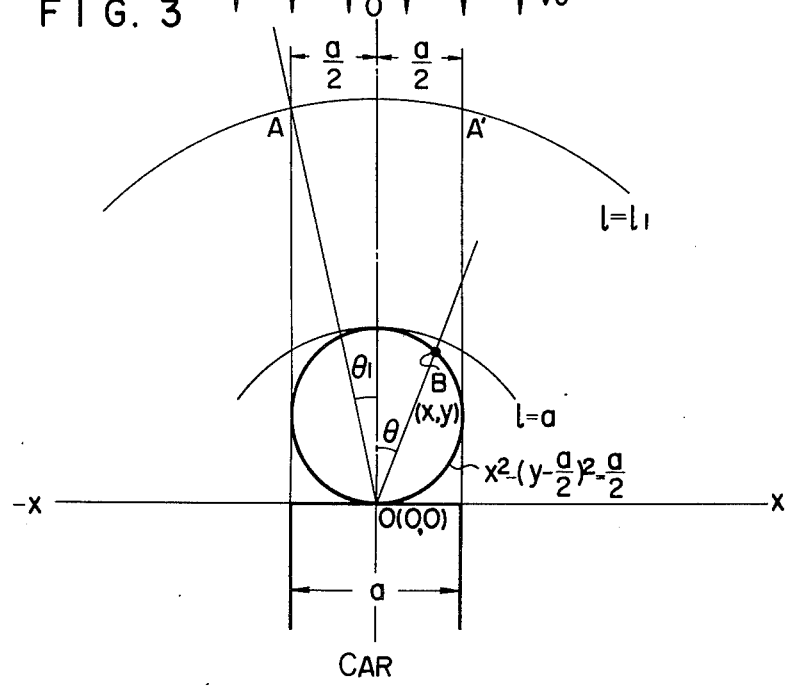

It is now assumed that an object approaches the car carrying the radar at a constant relative velocity $V_0$ relative to the car in a direction at right angles to the front, that is, in a direction parallel to a line 0-0' normal to the car front and passing through a point 0 of installation of transmitting and receiving antennas at the center of the car front, as shown in FIG. 3.

The point 0 of installation of the transmitting and receiving antennas is referred to as a reference point. Then, denoting the residual time left before the collision of the object with respect to the reference point by T the residual time $T_1$ left at the instant when the object reaches a point at distance $l = l_1$ (where $l_1 > a$, $a$ being the car width) from the reference point is given as $$T_1 = \frac{l_1}{V_0 \cos\theta}$$

where $\theta$ is the angle between a line connecting the object and reference point and line 0-0', and $V_0 \cos\theta$ is the relative velocity of the object relative to the reference point. It is to be noted that $T_1$ is greater the greater is $\theta$, that is, the further is the object apart from line 0-0'.

When the object collides with the car, the residual time is maximum in case when the object passes through point A (or A') spaced apart from line 0-0' by $a/2$. In this case, the residual time $(T_1)a/2$ is $$(T_1)_{a/2} = \frac{l_1}{V_0 \cos\theta_1}$$

where $$\theta_1 = \sin^{-1}\left(\frac{\frac{a}{2}}{l_1}\right) .$$

Now, the locus of points satisfying a constant residual time $$T_2 = \frac{a}{V_0}$$

will be examined by using the rectangular co-ordinates with line 0-0' in FIG. 3 taken as y-axis and car front taken as x-axis, and hence the reference point 0 taken as origin (0, 0). For any point B (x, y) satisfying relation $$T_2 = \frac{a}{V_0}$$

for a constant residual time.

$$\frac{l}{V_0 \cos\theta} = \frac{\sqrt{x^2 + y^2}}{V_0 \frac{y}{\sqrt{x^2 + y^2}}} = \frac{a}{V_0}$$

where $l$ is the length of the line segment $\overline{OB}$, and $\theta$ is the angle $<$ BOO'. Hence $$\therefore x^2 + (y - \frac{a}{2})^2 = (\frac{a}{2})^2$$

This means that the locus of points satisfying the constant residual time $$T_2 = \frac{a}{V_0}$$

is a circle with center at a point on line 0-0' at a distance of $a/2$ from the origin 0 and radius of $a/2$.

In this case, the residual time $T_1$ at the instant when the object reaches a point at distance $l = l_1$ from point 0 is detected and memorized, and collision is forecast if and only if the subsequently monitored residual time T comes to satisfy a condition $$\frac{T}{T_1} < \frac{T_2}{(T_1)} = \frac{\frac{a}{V_0}}{\frac{l_1}{V_0}} = \frac{a}{l} \cos \theta_1$$

that is $$T < \frac{a}{l_1} \cos \theta_1 \cdot T_1$$

while otherwise forecasting non-collision.

In this method, however, the forecasting of a collision cannot be executed unless the object comes within the distance $l = a$ from the transmitting and receiving antennas.

Therefore, though there is no problem inasmuch as the relative velocity is sufficiently small, with a greater relative velocity which exceeds a predetermined value the residual time would already be too short at the instant of forecasting a collision, resulting in too late delivery of the trigger signal for causing the expansion of the air bag.

This possibility might be reduced by increasing the radius of the constant residual time circle. By so doing, however, the accuracy of the forecasting of collision or non-collision is sacrificed.

A superior solution to this problem can be obtained if we can establish a collision forecasting zone, which is not a circle but has a transversal dimension equal to the car width $a$ and a dimension greater than the car width in the direction normal to the car front. A method for achieving this will now be discussed in connection with FIG. 4.

Figure 4:
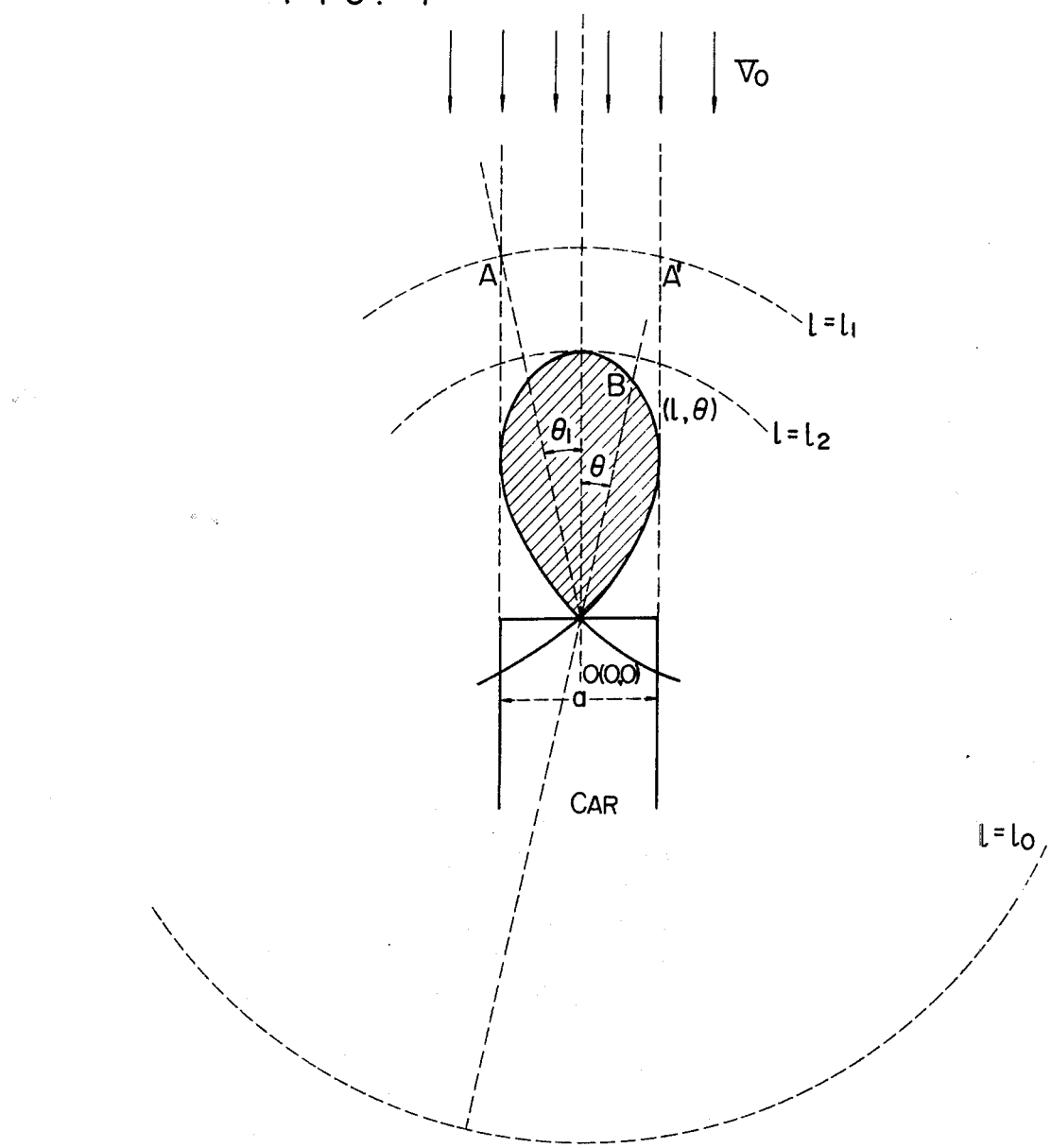

In the method shown in FIG. 4, a point on the extension of line connecting an object and point 0 (on the side of point 0 opposite the object) and at distance $l = l_0$ from point 0 is made the reference point.

In this case, denoting the residual time until the object reaches the reference point by T' the residual time $T_1'$ at the instant of reaching of a point at distance $l = l_1$ from point 0 by the object is given as $$T_1' = \frac{l_1 + l_0}{V_0 \cos \theta}$$

where $\theta$ is the angle between a line connecting the object and point 0 and line 0-0', $0 < |\theta| \leq \pi/2$, and $V_0 \cos \theta$ is the relative velocity of the object relative to the transmitting and receiving antennas at point 0. Like the previous case, $T_1'$ is greater the greater is $\theta$.

Again in the case when the object collides with the car, the residual time is maximum when the object passes through point A (or A') spaced apart from line 0-0' by $a/2$. In this case, the residual time $(T_1')_{a/2}$ is $$(T_1')_{a/2} = \frac{l_1 + l_0}{V_0 \cos \theta_1}$$

where $$\theta = \sin^{-1} \left( \frac{\frac{a}{2}}{l_1} \right).$$

Now, the locus of points satisfying a constant residual time $$T_2' = \frac{l_2 + l_0}{V_0}:$$

will be examined in terms of polar co-ordinates. For any point B $(l, \theta)$ satisfying relation $T_2' = (l_2 + l_0)/V_0$ for a constant residual time $$\frac{l + l_0}{V_0 \cos \theta} = \frac{l_2 + l_0}{V_0}$$

where $l$ is the distance of the object from point 0, and $\theta$ is the angle between a line connecting the object and point 0 and line 0-0'. Hence $$(l_2 + l_0) \cos \theta = l + l_0$$

Here, by setting $l_0$ and $l_2$ such as to satisfy $$l \cdot \sin \theta \leq \frac{a}{2}.$$

that is, such that the maximum transversal dimension of the locus of points satisfying the relation $(l_2 + l_0) \cos \theta = l + l_0$ is equal to the car width $a$, we can obtain the locus of points satisfying the constant residual time $T_2'$ as shown in FIG. 4. The residual time here is less than $T_2'$ if the object is within the enclosed locus zone (dashed area in FIG. 4) and is otherwise greater than $T_2'$.

Since in this case the enclosed locus zone has the same width dimension as the car width, we can forecast a collision if the objects intrude into the zone and forecast a non-collision otherwise.

More particularly, the residual time $T_1'$ with respect to the afore-said reference point when the object reaches a point at distance $l = l_1$ from point 0 is detected and memorized for forecasting collision if the subsequently monitored residual time T' comes to satisfy a condition $$\frac{T'}{T_1'} < \frac{T_2'}{(T_1')_{a/2}} = \frac{\frac{l_2 + l_0}{V_0}}{\frac{l_1 + l_0}{V_0 \cos \theta}} = \frac{l_2 + l_0}{l_1 + l_0} \cos \theta_1$$

that is $$T' < \frac{l_2 + l_0}{l_1 + l_0} \cos\theta_1 \cdot T_1'$$

and otherwise forecasting non-collision.

The above discussion has been made under the assumption that the object approaches the car in the direction at right angles to the car front, but a similar discussion holds in the case when an object approaches the car front in an oblique direction.

FIGS. 5a to 5d show collision forecasting zones established with the prior art two-channel system and the system according to the invention in cases when the object approaches the car in a directions at right angles to and oblique to the car front.

The principles underlying the collision forecasting function of the prior art two-channel Doppler radar system are as follows.

In this system, transmitting and receiving antennas of the two channels are provided on opposite ends of the car front. When an object is approaching the car, at the instant of detection by either one of the two channels of the distance $l = 2a$ ($a$ being the car width) of the object from the transmitting and receiving antennas of that channel, the residual time $$T_{2a} = \frac{2a}{V_0},$$

where $V_0$ is the greater one of the relative velocities detected by the respective channels at the aforesaid instant, is memorized for forecasting collision if the residual times detected by both the channels get less than $T_{2a}$.

Figure 5A:
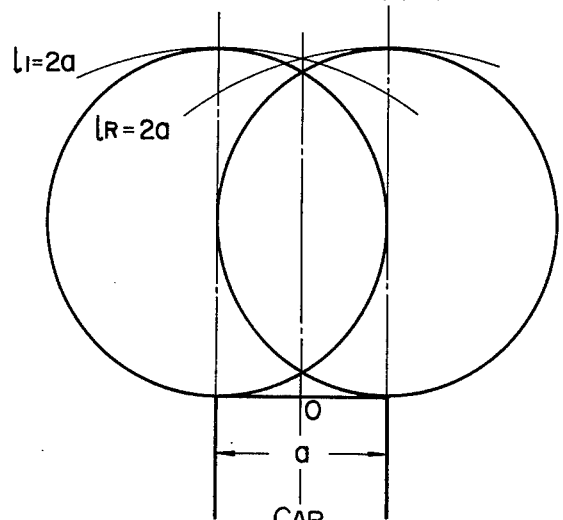
Figure 5B:
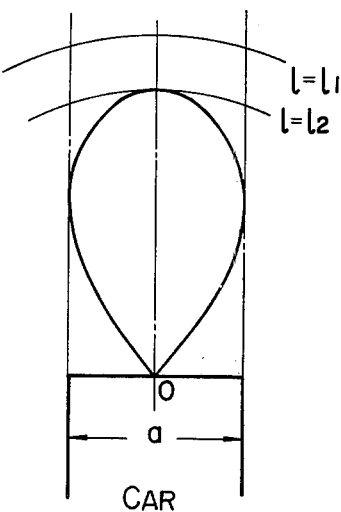
Figure 5C:
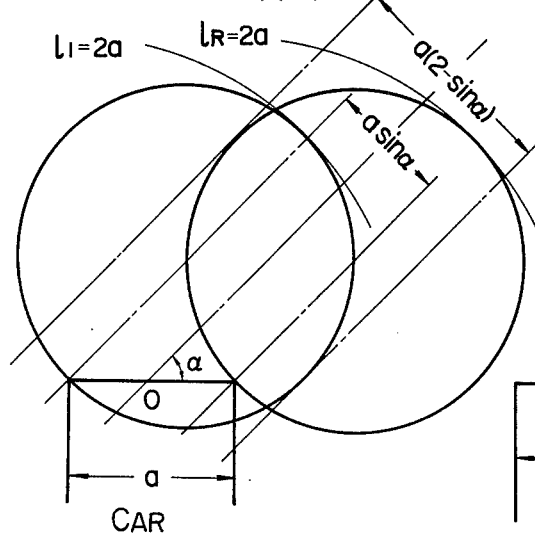
Figure 5D:
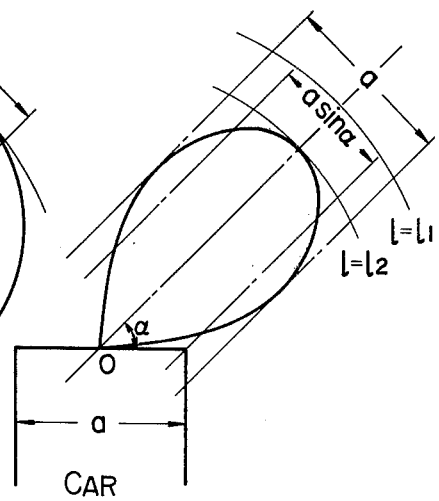

FIG. 5a shows the collision forecasting zone established with the prior art system in the case when an object approaches a car in a direction at right angles to the car front, FIG. 5b shows one established with the system according to the invention in the case when an object approaches the car in a direction at right angles to the car front, FIG. 5c shows one established with the prior art system in the case when an object approaches the car in a direction oblique to the car front, and FIG. 5d shows one established with the system according to the invention in the case when an object approaches the car in a direction oblique to the car front.

As is apparent from these Figures, there is no substantial difference in the area of the collision forecasting zone and distance of forward end of the zone from the car front between the prior art system and system according to the invention.

Either system is not prone to mal-forecasting of collision despite non-collision so long as the object approaches the car in the direction normal to the car front, but either is prone to mal-forecasting in case the object approaches car in a direction at an angle $\alpha (\alpha \neq 90°)$ to the car front. In the system according to the invention, the transversal dimension of the collision forecasting zone is always irrespective of the angle of direction of the approaching object such as in the case of FIG. 5d. The actual transversal dimension of the collision forecasting zone is, however, $a.\sin\alpha$. This means that with the system according to the invention the transversal dimension of the mal-forecasting zone is $a - a.\sin\alpha = a(1 - \sin\alpha)$.

On the other hand, with the prior art system the transversal dimension of the collision forecasting zone is $a(2 - \sin\alpha)$, as is apparent from FIG. 5c, while the transversal dimension of the mal-forecasting zone is $a(2 - \sin\alpha) - a.\sin\alpha = 2a(1 - \sin\alpha)$, that is, double that with the system according to the invention. Thus, it can be said that the system according to the invention is less prone to mal-forecasting.

In the design of a specific construction of the system according to the invention, how to obtain the residual time $T'$ in case where the reference point is behind the transmitting and receiving antennas at distance $l = l_0$ therefrom is the biggest problem. The simplest method that might be thought is to physically extend the interval until the detection of the Doppler signals from the transmitting and receiving antenna by providing a coaxial cable or delay line. Such measure, however, is impractical because it leads to increase of loss and increased cost.

A practical method is to process the signals through a suitable circuit means. For example, the Doppler signals are converted through limiter amplifiers or other suitable means into corresponding rectangular waves (as shown at $a$ and $b$ in FIG. 6). The rising of the rectangular wave derived from Doppler signal $d_1$ is used to set an R-S flip-flop, while using the rising of the rectangular wave derived from another Doppler signal $d_2$ to reset the flip-flop, thereby producing flip-flop output as shown at $c$ in FIG. 6. Also, another R-S flip-flop is set by the rising of the rectangular wave based on the Doppler signal $d_1$ and reset by the falling of the rectangular wave based on the Doppler signal $d_2$, thereby producing flip-flop output as shown at $d$ in FIG. 6. In FIG. 6, $T_1$ and $T_2$ represent the periods of the Doppler signals $d_1$ and $d_2$, and $$T_1 \approx T_2 \alpha \frac{1}{V_r}$$

where $V_r$ is the relative velocity of the object relative to the transmitting and receiving antennas. Since the phase difference $\Delta\phi$ between the Doppler signals $d_1$ and $d_2$ is proportional to the distance or, stated mathematically, $$\Delta\phi \approx \frac{T_3}{T_1} \approx \frac{T_3}{T_2} \alpha \, l$$

the residual time $T$ until the object reaches the transmitting and receiving antennas is $$T = \frac{l}{V_r} \alpha \, T_3$$

Also, the residual time $T'$ left for the object to proceed past the transmitting and receiving antennas until it reaches a point as distance $l = l_0$ from the antennas is $$T' = \frac{l + l_0}{V_r} \alpha \, T_3 + T_1 \approx T_3 + T_2 \approx T_4$$

where $$l_0 = \frac{75 \text{ (MHz.m)}}{\Delta f_{12} \text{ (MHz)}}$$

Thus, $T_4$ in FIG. 6 represents the residual time left for the object to proceed past the transmitting and receiving antennas until it reaches a point behind the antennas and at a distance $$l = l_0 = \frac{75 \text{ (MHz.m)}}{\Delta f_{12} \text{ (MHz)}}$$

therefrom.

The fourth feature of the invention resides in a system for delivering a trigger signal for causing the expansion of the air bag a predetermined time $T_c$ before the object collides with the car, and this function is the second requirement for the collision sensor Doppler radar.

The principles regarding this function underlying the invention will now be discussed.

Referring to FIG. 7, which assumes that an object approaches the car at relative velocity $V_0$ in a direction at right angles to the car front, the residual time $T_1$ with respect to point 0 of installation of the transmitting and receiving antennas at the instant when the object reaches a point at distance $l = l_1$ from the point 0 is detected and memorized. Also, from the instant of memorization of the residual time $T_1$ the subsequent time $t$ actually elapsed is counted. Then, at the instant when either condition $T_1 - t < T_c$ ($T_c$ being the preset residual time) or condition $T \leq T_c$ (T being the residual time subsequent to the detection and memorization of $T_1$) is first satisfied, the residual time until the object collides with the car front is determined to be no longer greater than $T_c$.

A problem encountered here is that an error between the timing of the generation of a signal indicating that the residual time is less than $T_c$ and the actual residual time until the collision is liable to result depending upon the transversal position of the object with respect to the car, that is, depending upon which part of the car front the object will collide with.

By way of example, the actual residual time at the instant of generation of the signal indicating that the residual time is less than $T_c$ in case when the object is assumed to approach the car in the direction at right angles to the car front, with
$T_c = 65$ msec.,
$l_1 = 3$ m, and
$a = 1.5$ m,
is shown in FIG. 7 with the relative velocity of the object taken as the third parameter.

As is apparent from the Figure, within the relative velocity range from 30 kg/h to 120 km/h the maximum error is 37 percent. This however, results with an object approaching the edge of the car spaced apart by 0.75 m from the center of the car at the relative velocity of 30 km/h. In the case of such low relative velocity, a slight lag of the delivery of the trigger signal for the expansion of the air bag practically presents no problem.

FIG. 8 shows a specific construction of the frequency switching type single channel Doppler radar having the afore-mentioned first to fourth features of the invention.

Referring to the Figure, reference numeral 1 designates a microwave oscillator provided with varactor diode frequency modulator receiving as bias voltage the output of a one-third frequency divider 8 to be described hereinafter and producing three, successively switched microwaves at different frequencies $f_1$, $f_2$ and $f_3$.

Numeral 2 designates an isolator for protecting the microwave oscillator 1 from the effects of the load, and numeral 3 a directional coupler for coupling the output of the microwave oscillator 1 mostly to a transmitting antenna 1 and partly to a mixer and also coupling the output of a receiving antenna 6 mostly to the mixer 4. The mixer 4 mixes part of the output of the microwave oscillator 1 and reflected wave received by the receiving antenna 6 to produce a Doppler signal. The most part of the output of the microwave oscillator 1 is radiated from the transmitting antenna 5, and the receiving antenna 6 receives reflected wave reflected from an object. The elements 1 to 6 constitute a microwave section of the Doppler radar.

Numeral 7 designates a frequency switching signal generator with the frequency of the switching signal (see $a$ in FIG. 9).

The afore-mentioned one-third frequency divider 8 divides the output frequency of the frequency switching signal generator 7 by 3, and it provided outputs $V_{G1}$, $V_{G2}$ and $V_{G3}$ (see $b_1$ to $b_3$ in FIG. 9) each phase shifted from another by $2\pi/3$ radians to control the gate of respective first, second and third amplifiers 9, 10 and 11 and also a frequency switching bias signal $V_B$ (see $c$ in FIG. 9) consisting of three, successively switched bias voltage components coupled to the varactor diode frequency modulator in the microwave oscillator 1. The first amplifier 9 has a gate controlled by the output $V_{G1}$ of the one-third frequency divider 8 for amplifying part of the output of the mixer 4. The second amplifier 10 has a gate controlled by the output $V_{G2}$ of the one-third frequency divider 8 for amplifying part of the output of the mixer 4. The third amplifier 11 has a gate controlled by the output $V_{G3}$ of the one-third frequency divider for amplifying part of the output of the mixer 4.

Numeral 12 designates a first bandpass filter selectively passing only frequency components within the Doppler signal frequency band from the output of the first amplifier 9, numeral 13 a second bandpass filter selectively passing only frequency components within the Doppler signal frequency band from the output of the second amplifier 10, and numeral 14 a third bandpass filter selectively passing only frequency components within the Doppler signal frequency band from the output of the third amplifier 11.

Numeral 15 designates a first waveform converter for converting the sinusoidal output of the first bandpass filter 12 into a rectangular wave, numeral 16 a second waveform coverter for converting the sinusoidal output of the second bandpass filter 13 into a rectangular wave, and numeral 17 a third waveform converter for converting the sinusoidal output of the third bandpass filter 14 into a rectangular wave.

Numeral 18 designates a first clock signal generator producing a clock signal at frequency $f_{cL-1}$. Numeral 19 designates a second clock signal generator producing a clock signal at frequency $f_{cL-2}$ (which is such that $$f_{cL-1} : f_{cL-2} = 1 : \frac{l_1 + l_0}{l_1 + l_0} \cos \theta_1)$$

Numeral 20 designates a first R-S flip-flop set by the rising of the rectangular wave output of the first waveform converter 15 and reset by the rising of the rectangular wave output of the second waveform converter 16. The pulse length of the output of this flip-flop gives the residual time T until an object reaches the transmitting and receiving antennas.

Numeral 21 designates an inverter to invert the phase of the output of the second waveform converter 16. Numeral 22 designates a second R-S flip-flop set by the rising of the rectangular wave output of the first waverform converter 15 and reset by the rising of the rectangular wave output of the inverter 21 (i.e., the falling of the rectangular wave output of the second waveform converter 16). The Q output of this flip-flop gives the residual time T' left for the object to proceed past the transmitting and receiving antennas until it reaches a point behind the antennas at distance $l = l_0$ therefrom.

Numeral 23 designates a D flip-flop receiving the output of the first waveform converter 15 at its D input terminal and the output of the third waveform converter 17 at its CL terminal. It serves as a detector to detect the sense of relative velocity. If the D terminal input is leading the phase of the CL terminal input, that is, if the output frequency of the microwave oscillator 1 is in the state as shown at $d$ in FIG. 9, it provides output 1 when the object is approaching the car and otherwise produces output 0.

Numeral 24 is a detector giving intelligence about the distance of the object by counting the number of clock pulses of the first clock signal generator 18 under the control of the output of the first R-S flip-flop 20.

Numeral 25 designates a detector providing output 1 if the output of the detector 24 corresponds to a distance $l$ no greater than $l_1$ and otherwise providing output 0.

Numeral 26 designates a first AND circuit, whose output is 1 if the Q output of the D flip-flop 23 and the output of the detector 25 are both 1 and is otherwise 0.

Numeral 27 designates a memory for counting and memorizing the number of clock pulses of the first clock signal generator 18 corresponding to the total pulse length of a constant number of pulses of the Q output of the first R-S flip-flop 20 right after the changing of the output of the first AND circuit 26 to 1.

Numeral 28 is a counter for counting the time $t$ elapsed from the instant of changing of the output of the first AND circuit 26 to 1.

Numeral 29 is a detector comparing $T_1$ memorized in the memory 27 and elapsed time $t$ counted by the counter 28. It produces output 1 if $T_1 - t \leq T_c$ (where $T_c$ is a preset residual time) is satisfied and otherwise output 0.

Numeral 30 is a detector detecting the number of clock pulses of the first clock signal generator 18 corresponding to the total pulse length of a constant number of pulses of the Q output of the first R-S flip-flop 20 corresponding to the residual time T until the object reaches the transmitting and receiving antennas 5 and 6.

Numeral 31 is a detector providing output 1 if the output of the detector 30 corresponds to a residual time T no greater than the preset residual time $T_c$ and otherwise providing output 0.

Numeral 32 designates a first OR circuit, whose output is 1 if at least either detector 29 or detector 31 provides output 1 and is otherwise 0.

Numeral 33 designates a memory for counting and memorizing the number of clock pulses of the second clock signal generator 19 corresponding to the total pulse length of a constant number of pulses of the Q output of the second R-S flip-flop 22 right after the changing of the output of the first AND circuit 26 to 1.

Numeral 34 designates a detector detecting the number of clock pulses of the first clock signal generator 18 corresponding to the total pulse length of a constant number of the Q output of the R-S flip-flop 22 corresponding to the residual time T' left for the object to proceed past the transmitting and receiving antennas 5 and 6 on the car until it reaches a point behind and at distance $l = l_0$ from the antennas.

Numeral 35 designates a detector comparing $T_1'$ memorized in the memory 33 and T' detected by the detector 34. It provides output 1 if $T' \leq T_1'$ and otherwise output 0.

Numeral 36 designates a second AND circuit, whose output is 1 if the outputs of the relative velocity sense detector 23, first OR circuit 32 and detector 35 are all 1 and is otherwise 0.

Numeral 37 designates a detector providing output 1 if the output of the detector 24 corresponds to a distance $l$ no greater than $a/2$ and otherwise providing output 0.

Numeral 38 designates a third AND circuit, whose output is 1 if the Q output of the D flip-flop 23 and the output of the detector 37 are both 1 and is otherwise 0.

Numeral 39 designates a second OR circuit, which delivers a trigger signal if at least either output of the second or third AND circuit 36 or 38 produces output 1.

The elements 7 to 39 constitute a signal processing section.

The operation of the instant embodiment will now be described with reference to the waveform charts of FIGS. 9 and 10.

The output of the frequency switching signal generator 7, as shown at $a$ in FIG. 9, enters the one-third frequency divider 8, which provides outputs $V_{G1}$, $V_{G2}$ and $V_{G3}$ phase shifted from one another by $2\pi/3$ radians of one-third of the period, as shown at $b_1$, $b_2$ and $b_3$ in FIG. 9, to the respective first, second and third amplifiers 9, 10 and 11 and also frequency switching bias output $V_B$, as shown at $c$ in FIG. 9, to a bias terminal of the varactor diode in the microwave oscillator 1 having a frequency modulator.

The microwave oscillator 1 clad with frequency modulator produces an output whose frequency thus changes as shown at $d$ in FIG. 9.

The microwave oscillator output having this frequency character is coupled through the isolator 2 and directional coupler 3, and its major part is radiated from the transmitting antenna 5.

If the transmitted wave is reflected at an object, the reflected wave is received by the receiving antenna 6, whose output is coupled through the directional coupler 3 to the mixer 4. To the mixer 4 is also coupled through the directional coupler 3 part of the output of the microwave oscillator 1. These two inputs to the mixer are mixed therein to produce an output as shown at $e$ in FIG. 9, which is coupled to the first to third amplifiers 9 to 11.

The afore-mentioned outputs $V_{G1}$, $V_{G2}$ and $V_{G3}$ of the one-third frequency divider added to the respective amplifiers 9, 10 and 11, permit the amplifying function of these amplifiers 9 to 11 only if they are 1, and otherwise the amplifiers provide output 0. Thus, the outputs of the amplifiers 9, 10 and 11 are as shown at $f_1, f_2$ and $f_3$ in FIG. 9.

These outputs of the first to third amplifiers 9 to 11 are coupled to the respective first to third bandpass filters 12 to 14, which selectively pass only the frequency components within the Doppler signal frequency range corresponding to the range of the relative velocity of the object. The outputs of the bandpass filters 12 to 14 are thus sinusoidal, as shown at $g_1, g_2$ and $g_3$ in FIG. 9, and they serve as Doppler signals $d_1, d_2$ and $d_3$.

These Doppler signals are coupled to the respective first to third waveform converters 15 to 17, which produce respective outputs as shown at $l l$, $h_2$ and $h_3$ in FIG. 9, which are 1 if the Doppler signal input is positive and 0 if the input is negative.

It will be understood that the pulse lengths $T_a$, $T_b$ and $T_c$ of these outputs are $$T_a \approx T_b \approx T_c \; \alpha \; \frac{1}{V_r}$$

where $V_r$ is the relative velocity of the object relative to the transmitting and receiving antennas 5 and 6.

The first R-S flip-flop 20, which is set by the rising of the output of the first waveform converter 15 and reset by the rising of the output of the second waveform converter 16, produces output as shown at $i$ in FIG. 9.

As mentioned earlier, the pulse length $T_d$ of this output is related to the phase difference $\Delta\phi_{12}$ between the Doppler signals $d_1$ and $d_2$ as $$\Delta\phi_{12} \; \frac{T_d}{T_a} \; \alpha \approx \frac{T_d}{T_b} \; \alpha \; l$$

where $l$ is the distance of the object from the transmitting and receiving antennas. Also, as mentioned earlier $$T_d \; \alpha \; T_a \cdot l \approx T_b \cdot l \; \alpha \; \frac{l}{V_r} = T$$

that is, $T_d$ is proportional to the residual time $T$ until the object reaches the transmitting and receiving antennas 5 and 6 on the car.

The second R-S flip-flop 22, which is set by the rising of the output of the first waveform converter 15 and reset by the falling of the output of the second waveform converter 16 (i.e., the rising of the output of the inverter 21), produces output as shown at $j$ in FIG. 9.

As mentioned earlier, the pulse length $T_e$ of this output is proportional to the residual time $T'$ left for the object to proceed past the transmitting and receiving antennas 5 and 6 until it reaches a point on the extension of the line connecting the object and transmitting and receiving antennas behind and at distance $l = l_0$ where $$l_0 = \frac{c}{4 \Delta f_{21}} = \frac{75 \text{ (MHz.m)}}{\Delta f_{21} \text{ (MHz)}},$$

C being the propagation speed, and $\Delta f_{21} = f_2 - f_1$ from the antennas.

The relative velocity sense detector 23 constituted oscillator the D flip-flop produces an output as shown at $k$ in FIG. 9, which is 1 if the phase of the output of the first waveform converter 15 is leading that of the output of the third waveform converter 17, that is, if the object is approaching the transmitting and receiving antennas on the car, and otherwise 0 (provided the output frequency of the microwave oscilltor 1 is as shown in $d$ in FIG. 9).

The detector 25 always monitors the output of the detector 24, which counts the number of clock pulses of the $f_{cL-1}$ clock signal generator 18 gated under the control of the output of the R-S flip-flop 20 for obtaining the distance intelligence. Its output changes from 0 to 1 when the detected distance becomes less than the preset distace $l_1$, and at this instant the output of the first AND circuit 26 changes to 1 if the output of the relative velocity sense detector 23 constituted by the D flip-flop is 1, that is, if the object is approaching the car.

The counter 28 starts to count the time $t$ elapsed from the instant when the output of the AND circuit 26 becomes 1. The memory 27 counts and memorizes the number of clock pulses of the first clock pulse generator 18 corresponding to the total pulse length of a constant number of pulses produced from the Q output of the first R-S flip-flop 20 right after the changing of the output of the first AND circuit 26 to 1.

The number of $f_{cL-1}$ clock pulses memorized in the memory 27 corresponds to the residual time $T_1$ with respect to the trasmitting and receiving antennas 5 and 6 at the instant when the object passes through a point at distance $l = l_1$ from the antennas.

The detector 29 always compares the residual time $T_1$ memorized in the memory 27 and the time $t$ elapsed from the instant of passing of the point at distance $l = 0$ $l_1$ from the transmitting and receiving antennas by the object as counted by the counter 28, and if $T_1 - t$ gets less than the preset residual time $T_c$, it decides that the residual time left until the object collides with the car is no longer greater than $T_c$ and produces output 1.

Meanwhile, the detector 30 always counts a number of clock pulses from the clock pulse generator 18 within the total pulse length of a constant number of pulses of the output of the first R-S flip-flop 20 corresponding to the residual time $T$ until the object reaches the transmitting and receiving antennas 5 and 6 irrespective of the distance $l$ of the object from the antennas. The detector 31 compares the prevailing residual time $T$ and the preset residual time $T_c$, and produces output 1 when it detects $T \leq T_c$.

At the instant when either the detector 29 or the detector 31 provides output 1, the first OR circuit 32 decides this instant to be the beginning of the situation deemed to lead to a collision of the object with the car after the lapse of the preset residual time $T_c$.

The elements 27 to 32 constitutes a preset residual time detection circuit block.

The detector 34 counts the clock pulses of the first clock signal generator 18 gated under the control of the second R-S flip-flop 22 to detect the residual time $T'$ left for the object to proceed past the transmitting and receiving antennas 5 and 6 on the car until it reaches a point behind and at distance $l = l_0$ from the antennas.

Meanwhile, the memory 33 memorizes the residual time $T_1'$ with respect to the point behind and at distance $l = l_0$ from the transmitting and receiving antennas provided at the front center of the car at the instant when the object passes through a point at distance $l = l_1$ from the antennas as the corresponding number of clock pulses of the second clock pulse generator 19.

As mentioned earlier, the clock signal frequency $f_{cL-1}$ of the first clock signal generator 18 and the clock signal frequency $f_{cL-2}$ of the second clock signal generator 19 are related such that $$f_{cL-1} : f_{cL-2} = 1 : \frac{l_2 + l_0}{l_1 + l_0} \cos \theta_1$$

This means that the clock pulse number memorized in the memory 33 and the clock pulse number counted by the detector 34 can be compared directly by the detector 35. If the number of $f_{cL-2}$ clock pulses memorized in the memory 33 is larger than the number of $f_{cL-1}$ clock pulses counted by the detector 34, the following formula, $$T' < \frac{l_2 + l_0}{l_1 + l_0} \cos \theta_1 \cdot T_1'$$

is satisfied, and hence it is determined that the object will collide with the car.

The elements 33 to 35 constitutes a collision forecasting circuit block.

When a situation with the relative velocity sense detector 23 providing output 1 indicating that the object is approaching the car, the first OR circuit 32 coming up with output 1 indicating that the predetermined time $T_c$ before the collision of the object with the car has set in and the detector 35 coming up with output 1 representing the forecast of collision of the object with the car sets in, the second AND circuit 36 produces output 1, which is delivered through the second OR circuit 39 as the trigger signal for causing the expansion of the air bag.

The detector 37 and third AND circuit 38 constitute a secondary trigger signal generating circuit operating irrespective of the failure of the operation of the primary trigger signal generating circuit constituted by the elements 25 to 36. More particularly, if the second AND circuit 36 fails to provide output 1 due to such cause as failure of forecasting of the collision of object with car or failure of detection of residual time no greater than $T_c$, the detector 23 produces output 1 upon detection of reaching of the object to a point at distance $l \leq a/2$ from the transmitting and receiving antennas 5 and 6. Thereupon, the third AND circuit 38 provides 1 if the output of the relative velocity sense detector 23 is 1 indicating that the object is approaching the car, the output 1 which is delivered through the second OR circuit 39 as the trigger signal for expansion of the air bag.

FIG. 10 shows the time relation of outputs of the elements 25, 26, 29, 31, 32, 35, 36, 37, 38 and 39.

What we claim is:

1. A Doppler radar for forecasting collision comprising a microwave oscillator provided with a frequency modulator, the bias voltage to said frequency modulator being consecutively switched at a constant interval in the order of voltage level $V_{B1}, V_{B2}, V_{B3}, V_{B1}, \ldots,$ to consecutively switch the oscillation frequency of said microwave oscillator in the order of $f_1, f_2, f_3, f_1, \ldots,$ where $f_1 < f_3 < f_2, f_2 - f_1 = \Delta f_{21}, f_3 - f_1 = \Delta f_{31}, \Delta f_{21} \cdot l_{max} < 150$ MHz.m, $\Delta f_{31} \cdot l_{max} < 75$ MHz.m, $l_{max}$ being the maximum detection distance required for the Doppler radar to detect $l_{max}$ being the maximum detectable distance of the Doppler radar, the output of said microwave oscillator being coupled through an isolator and a directional coupler for radiating from a transmitting antenna provided at the center of car front and also for partly coupling to a mixer, Doppler signals $d_1, d_2$ and $d_3$ corresponding respectively to the frequencies $f_1, f_2$ and $f_3$ being obtained by mixing in said mixer the microwave oscillator output partly coupled through the directional coupler and a reflected wave output produced from a receiving antenna also provided at the center of the car front and receiving reflected wave reflected at an object, means for detecting the distance of the object from the antennas from the phase difference between the Doppler signals $d_1$ and $d_2$, detecting the residual time left for the object to reach the antennas from a time length corresponding to said phase difference and determining an instant when the detected residual time becomes equal to a preset residual time from said time length, and means for determining the sense of relative velocity of the object relative to the antennas from the phase difference between the Doppler signals $d_1$ and $d_3$.

2. A Doppler radar for forecasting collision according to claim 1, which further comprises means for detecting and memorizing the residual time $T_1'$ left for the object to reach a reference point on a line connecting the object and center of the car front and behind and at distance $l = l_0$ from the center of the car front at an instant when the object reaches a point ahead of and at distance $l = l_1$ from the center of the car front and monitoring subsequent residual time $T'$ left for the object to reach said reference point for forecasting the occurrence of collision if $T'$ satisfies $$T' \leq \frac{l_2 + l_0}{l_1 + l_0} \cos \theta_1 \cdot T_1'$$

where $$\theta_1 = \sin^{-1} \left(\frac{a}{l_1}\right),$$

$a$ being the car width, and $l_2'$ in $(l_0 + l_2')\cos \theta = l + l_0$ when the maximum value of $l \cdot \sin \theta$ is $a/2$, $\theta$ being $-\pi/2 \leq \theta \leq \pi/2$.

3. A Doppler radar system for use on a vehicle, comprising:

a microwave oscillator;

means for sequentially modulating said microwave oscillator to generate microwave frequencies $f_1, f_2$ and $f_3$, where $f_1 < f_3 < f_2$, in the order $f_1, f_2, f_3, f_1, \ldots$;

antenna means coupled to said microwave oscillator to transmit said microwave frequencies $f_1, f_2$ and $f_3$ and to receive portions of the transmitted frequencies reflected from an object having a relative velocity to said vehicle;

means coupled to said oscillator and antenna means for mixing at least a portion of said transmitted and received microwave frequencies to obtain Doppler signals $d_1, d_2$ and $d_3$ corresponding to said frequencies $f_1, f_2$ and $f_3$, respectively;

means coupled to said mixing means for separately amplifying and filtering each of said Doppler signals $d_1, d_2$ and $d_3$;

distance detecting means coupled to said amplifying and filtering means for detecting the distance between said object and said antenna means from the phase difference between said Doppler signals $d_1$ and $d_2$, said distance detecting means including means for comparing the detected distance with a preset reference distance;

residual time detecting means coupled to said amplifying and filtering means for detecting the residual time left for said object to reach said antenna means, said residual time detecting means including means for comparing said detected residual time with a preset reference residual time;

direction determining means coupled to said amplifying and filtering means for determining the direction of movement of said object relative to said antenna means from the phase difference between said Doppler signals $d_1$ and $d_3$; and means coupled to said distance detecting means, said residual time detecting means, and said direction determining means for generating an output signal only when the detected distance between said object and said antenna means is not greater than said reference distance, the detected residual time is not greater than said reference residual time and said direction determining means has determined that the direction of relative movement of said object and antenna means is toward each other.

4. The Doppler radar system according to claim 3, wherein said distance detecting means comprises means for counting pulses from a clock signal generator during a period corresponding to the phase difference between said Doppler signals $d_1$ and $d_2$ and means for generating an output signal when the number of counted clock pulses is not greater than a predetermined reference number of pulses corresponding to said predetermined reference distance.

5. The Doppler radar system according to claim 4, wherein said residual time detecting means includes:

memory means coupled to said distance detecting means and said direction determining means for counting and storing clock pulses from said clock signal generator during a period corresponding to the phase difference between said Doppler signals $d_1$ and $d_2$ upon the generation of said output signal from said distance detecting means and after said direction determining means has determined that the direction of relative movement of said object and said antenna means is toward each other;

counter means coupled to said distance detecting means and direction determining means for counting clock pulses from said clock signal generator only after the generation of said distance detecting means output signal and only after said direction determining means has determined that the direction of relative movement of said object and said antenna means is toward each other; and means coupled to said memory means and said counter means for generating an output signal only when the difference between the number of clock pulses stored in said memory means and the number of clock pulses stored in said counter means is not greater than a predetermined reference value.

6. The Doppler radar system according to claim 4, further comprising a collision forecasting circuit including:

memory means coupled to said distance detecting means and said direction determining means for counting and storing clock pulses from a second clock signal generator, generating pulses of a different frequency from those generated by the first clock signal generator, during a period corresponding to the combined periods of signals corresponding to said Doppler signals $d_1$ and $d_2$ upon the generation of said output signal from said distance detecting means and after said direction determining means has determined that the direction of relative movement of said object and said antenna means is toward each other;

counter means coupled to said distance detecting means and direction determining means for counting clock pulses from said first clock signal generator during said period corresponding to said combined periods and only after the generation of said distance detecting output signal and only after said direction determining means has determined that the direction of relative movement of said object and said antenna means is toward each other; and means coupled to said memory means and said counter means for generating an output signal only when the number of clock pulses counted by said counting means is not greater than the number of clock pulses stored in said memory means.

* * * * *